Patented Aug. 29, 1933

1,924,442

UNITED STATES PATENT OFFICE 1,924,442

DYESTUFF OF THE ANTHRAQUINONE SERIES

Georg Kränzlein, Martin Corell, and Ernst Diefenbach, Frankfort-on-the-Main, Germany, assignors to General Aniline Works, Inc., New York, N. Y., a corporation of Delaware No Drawing. Application October 30, 1931, Serial No. 572,224, and in Germany February 6, 1930

7 Claims. (Cl. 260—60)

The present invention relates to new dyestuffs of the anthraquinone series, more particularly it relates to new compounds of the following general formula:

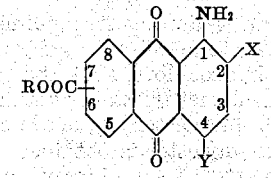

wherein R stands for hydrogen or an alkyl radical, X means the sulfonic acid group and $R_1$ means alkyl or an unsulfonated aryl or X stands for halogen and $R_1$ for alkyl or a sulfonated or unsulfonated aryl, and the —COOR group stands in one of the positions 5, 6, 7 and 8.

Our new products are obtainable by condensing a 2.4-dihalogen-1-aminoanthraquinone-carboxylic acid of the formula:

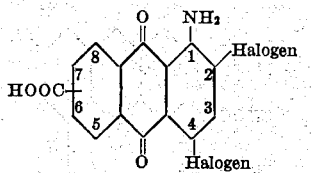

wherein the —COOH group stands in one of the positions 5, 6, 7 and 8, or a salt thereof, with an aliphatic or aromatic amine. The condensation is preferably effected by heating the alkali metal salts of the carboxylic acid together with the amine in the presence of water, an acid binding agent, such as sodium carbonate, and a small quantity of a catalytically acting substance, such as cuprous chloride, copper sulfate and the like.

The compounds, thus formed, are generally blue products. The compounds obtained from unsulfonated amines are suitable compounds for the production of lakes, due to the presence of the salt-forming carboxylic acid group. They may also be used as dyestuffs for cellulose acetate fibers or as intermediates for the production of other dyestuffs.

By treating the compounds formed from a 2.4-dihalogen-1-aminoanthraquinone-carboxylic acid and an aromatic amine, with a sulfonating agent, valuable water-soluble acid dyestuffs of the following general formula are produced:

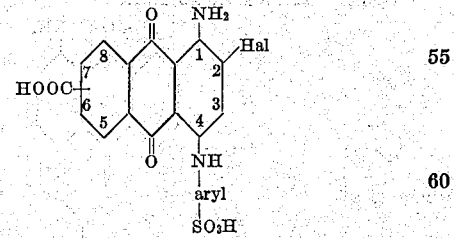

Another way of preparing these acid dyestuffs is by condensing a 2.4-dihalogen-1-aminoanthraquinone-carboxylic acid with an aromatic amine which contains already a sulfonic acid group.

The compounds obtainable by condensing a 2.4-dihalogen-1-aminoanthraquinone-carboxylic acid with an aliphatic amine or a sulfonated or unsulfonated aromatic amine and represented by the general formula:

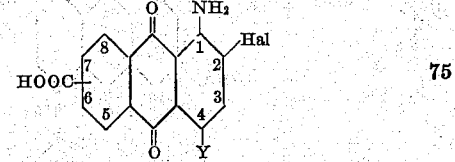

wherein Y represents the radical of an aliphatic amine or a sulfonated or unsulfonated radical of an aromatic amine, may be transformed into compounds in which the 2-position is occupied by a sulfonic acid group by exchanging the halogen atom in the 2-position for a sulfonic acid group according to known methods, for instance, by treatment with an alkali metal sulfite.

The above described new compounds containing the free carboxylic acid group in one of the positions 5, 6, 7 and 8, a halogen atom or the sulfonic acid group in the 2-position and a radical of an aliphatic amine or a sulfonated or unsulfonated radical of an aromatic amine in the 4-position may be transformed into the carboxylic ester compounds by treating the compounds with an esterifying agent according to known methods, for instance, with an alcohol in the presence of dry hydrogen halide. The carboxylic ester compounds are valuable dyestuffs of good dyeing properties. It is immaterial for the productin of the new dyestuffs whether the carboxylic acid group stands in 5-, 6-, 7- or 8-position of the anthraquinone nucleus.

As to the amines used for the preparation of our new compounds it is only essential that a reactive hydrogen atom is present at the nitrogen atom. Any primary or secondary amine of the aliphatic or aromatic series is suitable for the purpose of the present invention.

For the esterification of the carboxylic acid group any known method and esterifying agent may be used.

The following examples serve to illustrate the invention, but they are not intended to limit it thereto, the parts being by weight, unless otherwise stated:

(1) 42.5 parts of 1-aminoanthraquinone-2.4-dibromo-6-carboxylic acid are dissolved in 500 parts of water and 12 parts of sodium carbonate. To this solution, there are added 2 parts of cuprous chloride and 10 parts of aniline, whereupon the whole is heated, while stirring, at 90° C. to 100° C. until the originally red color of the reaction mixture has become blue. After cooling, the blue compound thus formed is isolated by addition of an acid. The compound has the following structural formula:

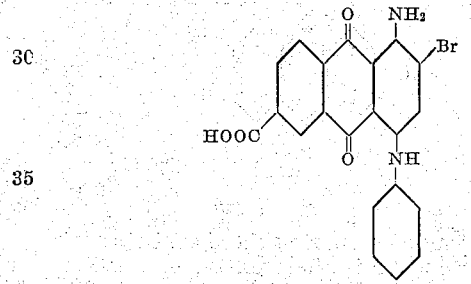

By sulfonating this compound with fuming sulfuric acid of 10% strength at 60° C. to 70° C., a dyestuff is obtained dyeing the animal fiber blue tints of good fastness properties. The sulfonic acid has the following probable formula:

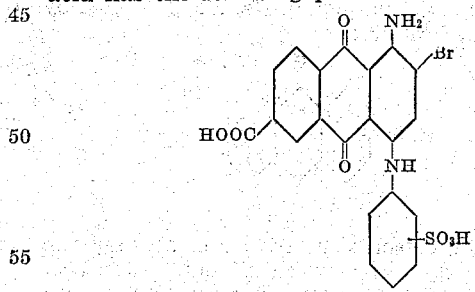

Compounds of similar properties are obtainable by using in the above example, instead of 1-aminoanthraquinone-2.4-dibromo-6-carboxylic acid, 1-aminoanthraquinone-2.4-dibromo-7-carboxylic acid.

The reaction occurs in a manner analogous to that described in the preceding example by using other bases instead of aniline. Thus, for instance, aliphatic amino-compounds may be used, such as methylamine, ethylamine, propylamine or the like, furthermore aromatic amino compounds, for instance, those of the benzene series, such as toluidines, cyclohexylamine or the like, bases of the naphthalene series, such as naphthylamine, tetrahydro-naphthylamine or the like, as well as derivatives of the before-mentioned bases.

By using instead of 1-aminoanthraquinone-2.4-dibromo-carboxylic acids the corresponding dichloro compounds, products are obtained which have a chlorine atom in the 2-position.

(2) 16 parts of 1-aminoanthraquinone-2-bromo-6-carboxylic-4-anilido-sulfonic acid, obtainable according to Example 1, are suspended in 200 parts of absolute ethyl-alcohol. Dry hydrogen chloride is introduced into the suspension at boiling temperature. Hereby the compound gradually dissolves with formation of the carboxylic-acid-ethyl ester which precipitates as the saturation with hydrogen chloride goes on. After some hours, the whole is allowed to cool, and the ester is filtered with suction. In the dry state, it is a blue powder, it dyes the animal fiber from an acid bath clear blue tints of good fastness to washing and to fulling. The compound has the following probable formula:

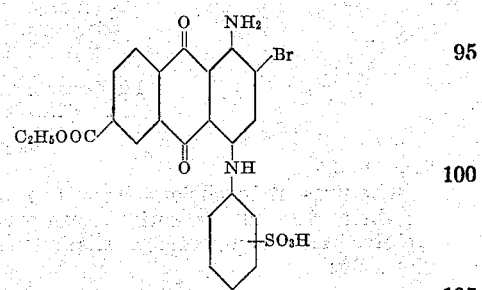

By treating 1-aminoanthraquinone-2-bromo-6-carboxy-4-anilido-sulfonic acid with methyl-alcohol and hydrochloric acid, the corresponding carboxylic-acid-methylester is obtained, by using butylalcohol, butylester is obtained, by using amylalcohol, amylester is obtained, and so on.

(3) 42.5 parts of 1-aminoanthraquinone-2.4-dibromo-6-carboxylic acid are dissolved in 500 parts of water and 12 parts of sodium carbonate; after addition of 2 parts of cuprous chloride and 12 parts of para-toluidine, the reaction mixture is heated at 90° C. to 100° C. while stirring, until the originally red color of the solution has turned blue. The compound, thus obtained, is isolated from the solution by addition of an acid. It has the following formula:

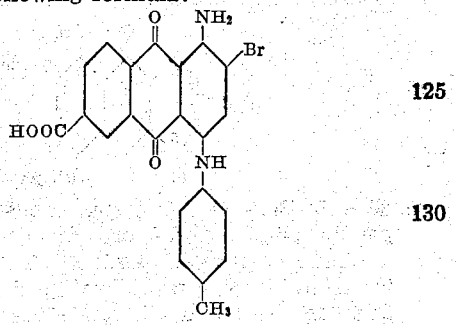

By treating this compound with fuming sulfuric acid of 20% strength, there is obtained a sulfonic acid of the following probable formula:

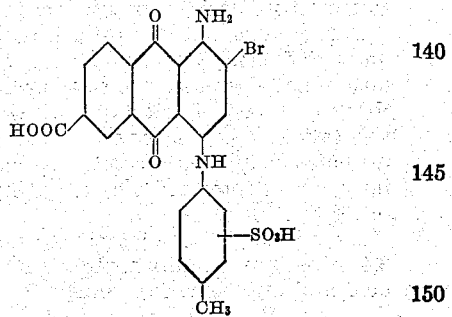

The dyestuff has properties similar to those of the sulfonic acid described in Example 1.

By treating the dyestuff in the manner described in Example 2 with ethylalcohol and hydrogen chloride, there is obtained the dyestuff of the following formula:

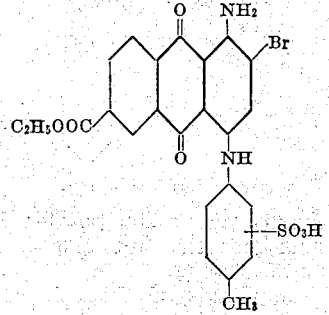

This dyestuff has properties similar to those of the dyestuff obtainable according to Example 2.

(4) By treating 1-amino-2-bromo-6-carboxy-4-anilidoanthraquinone, obtainable according to Example 1, with neutral potassium sulfite in phenol, the bromine atom in the 2-position is replaced by the sulfonic acid group and the 1-amino-6-carboxy-4-anilidoanthraquinone-2-sulfonic acid is obtained. 16 parts of this sulfonic acid are suspended in 200 parts of absolute ethyl alcohol. While heating, dry hydrogen chloride is introduced into this suspension. The ester, thus formed, precipitates, it is filtered with suction, washed with alcohol and dried. It forms a blue powder, dyeing wool from an acid bath fast blue tints of good fastness properties, especially of good fastness to washing and to fulling. The ester corresponds with the following formula:

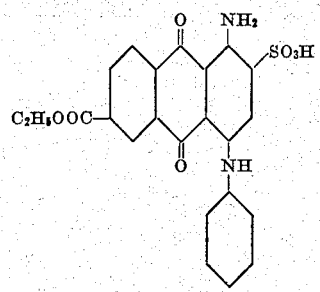

By using in the preceding example methylalcohol instead of ethylalcohol, the carboxylic-acid-methylester is obtained which has similar dyeing properties.

By esterifying 1-amino-6-carboxy-4-naphthyl-aminoanthraquinone-2-sulfonic acid instead of 1-amino-6-carboxy-4-anilidoanthraquinone-2-sulfonic acid, a dyestuff is obtained which also dyes wool blue tints.

(5) 42.5 parts of 1-amino-2.4-dibromoanthraquinone-6-carboxylic acid are heated in an autoclave to 170° C. to 180° C. for 12 hours with 100 parts of an aqueous methylamine-solution of 30% strength and 2 parts of cuprous chloride. After cooling, the reaction mixture is acidified whereby the 1-amino-4-methylamino-6-carboxylic acid of the formula

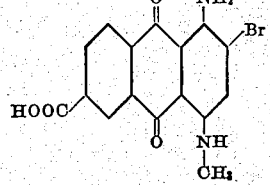

precipitates. It forms a blue compound, dyeing acetate-silk fast blue tints.

Instead of methylamine, other aliphatic amines may be used.

(6) 37.5 parts of 1-amino-2-bromo-4-methyl-aminoanthraquinone-6-carboxylic acid, obtainable according to Example 5, are dissolved in 350 parts of concentrated sulfuric acid; to this solution, there are added drop by drop 35 parts of absolute ethylalcohol. The formation of the ethyl ester is finished by heating the solution at 80° C. to 90° C. By cautiously pouring the solution on ice, the dyestuff is precipitated. It forms a violetish-blue powder which is no longer soluble in sodium carbonate. The dyestuff dyes acetate-silk violetish-blue tints. It corresponds with the following formula:

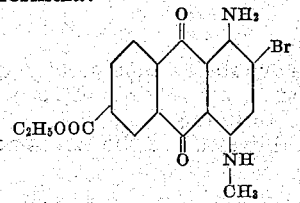

By treating this compound with potassium sulfite in phenol, the bromine atom in the 2-position is replaced by the sulfonic acid group.

We claim:
1. The compounds of the following general formula:

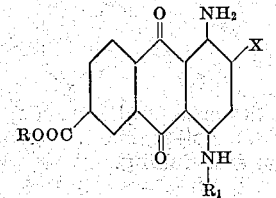

wherein R stands for hydrogen or an alkyl radical, X means the sulfonic acid group and $R_1$ an alkyl radical or an unsulfonated radical of the benzene or naphthalene series, or X stands for halogen and $R_1$ for an alkyl radical or a sulfonated or unsulfonated radical of the benzene or naphthalene series, said products having generally a blue color.

2. The acid dyestuffs of the general formula:

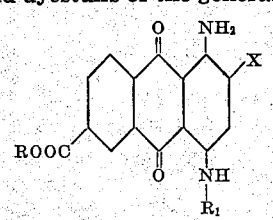

wherein X means the sulfonic acid group and $R_1$ stands for an alkyl radical or an unsulfonated radical of the benzene or naphthalene series, or X stands for a halogen atom and $R_1$ for a sulfonated radical of the benzene or naphthalene series, and wherein R represents an alkyl radical, said dyestuffs dyeing the animal fiber blue tints.

3. The acid dyestuffs of the general formula:

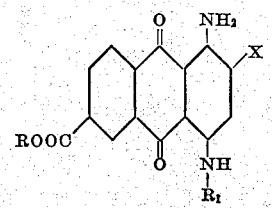

wherein X means the sulfonic acid group and $R_1$ stands for an unsulfonated radical of the benzene series, or X stands for a bromine atom and $R_1$ for a sulfonated radical of the benzene series, and R stands for methyl or ethyl, said dyestuffs dyeing the animal fiber blue tints.

4. The acid dyestuff of the formula:

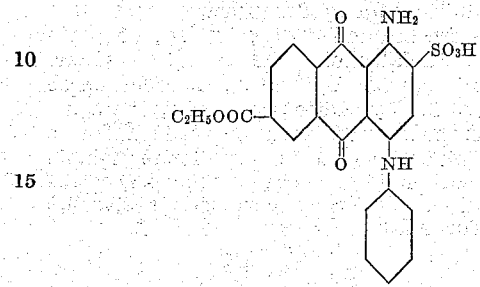

being in the dry state a blue powder, dyeing wool from an acid bath blue tints of good fastness to washing and to fulling.

5. The acid dyestuff of the formula:

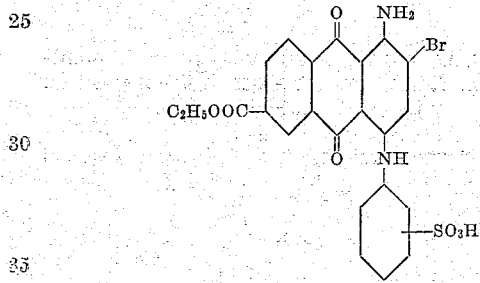

being in the dry state a blue powder, dyeing wool from an acid bath clear blue tints of good fastness to washing and to fulling.

6. The acid dyestuff of the formula:

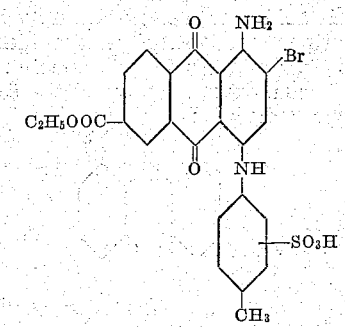

being in the dry state a blue powder, dyeing wool from an acid bath blue tints of good fastness to washing and to fulling.

7. The compounds of the following general formula:

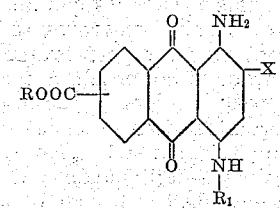

wherein R stands for hydrogen or an alkyl radical, X means the sulfonic acid group and $R_1$ means alkyl or an unsulfonated aryl, or X stands for halogen and $R_1$ for alkyl or a sulfonated or unsulfonated aryl, and the —COOR group stands in one of the positions 5, 6, 7 and 8, said products having generally a blue color.

GEORG KRÄNZLEIN.
MARTIN CORELL.
ERNST DIEFENBACH.